United States Patent
Jeong et al.

(10) Patent No.: US 8,243,755 B2
(45) Date of Patent: Aug. 14, 2012

(54) DMB PACKAGE AND MOBILE TERMINAL FOR RECEIVING DMB DATA AND METHOD OF RECEIVING DMB DATA

(75) Inventors: Seong-Han Jeong, Seoul (KR); Hyo-Soon Lee, Seoul (KR); Hee-Deog Kim, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 1785 days.

(21) Appl. No.: 11/492,236

(22) Filed: Jul. 25, 2006

(65) Prior Publication Data

US 2007/0025393 A1 Feb. 1, 2007

(30) Foreign Application Priority Data

Jul. 29, 2005 (KR) .................. 10-2005-0069932

(51) Int. Cl.
*H04J 3/16* (2006.01)
(52) U.S. Cl. ...................................... 370/466
(58) Field of Classification Search .......... 370/466, 370/310–313, 328, 398, 389, 484; 714/748; 725/62, 37, 38, 100, 131, 52, 39, 54; 375/240, 375/100; 455/3, 312, 414, 557, 412, 403, 455/425, 550; 348/441, 388, 425, 385, 14; 340/309, 7
See application file for complete search history.

(56) References Cited

U.S. PATENT DOCUMENTS

| | | | | |
|---|---|---|---|---|
| 7,746,407 B2 * | 6/2010 | Kang | ............................ | 348/441 |
| 7,801,560 B2 * | 9/2010 | Jeong et al. | .................... | 455/557 |
| 2001/0020975 A1 * | 9/2001 | Kerai et al. | ................ | 348/14.01 |
| 2003/0086568 A1 | 5/2003 | Kato et al. | | |
| 2004/0252965 A1 | 12/2004 | Moreno et al. | | |
| 2005/0075098 A1 * | 4/2005 | Lee et al. | .................... | 455/414.1 |
| 2005/0114899 A1 | 5/2005 | Shih et al. | | |
| 2005/0128366 A1 * | 6/2005 | Cha | ................. | 348/837 |
| 2005/0229222 A1 * | 10/2005 | Relan et al. | ................... | 725/100 |
| 2005/0261033 A1 * | 11/2005 | Wang | ............................ | 455/566 |
| 2005/0281289 A1 * | 12/2005 | Huang et al. | .................. | 370/484 |
| 2005/0282564 A1 * | 12/2005 | Yoo | ................. | 455/466 |
| 2006/0253875 A1 * | 11/2006 | Choi et al. | ..................... | 725/62 |

FOREIGN PATENT DOCUMENTS

| | | |
|---|---|---|
| JP | 2005-309606 | 11/2005 |
| TW | I230553 | 4/2005 |
| TW | I236293 | 7/2005 |
| WO | WO 2004/055655 | 7/2004 |
| WO | WO 2004/112268 | 12/2004 |

OTHER PUBLICATIONS

Victor H.S. Ha et al, Portable Receivers for Digital Multimedia Broadcasting, May 2004, IEEE Transactions on Consumer Electronics, vol. 50, No. 2, May 2004. (entire document).*

* cited by examiner

*Primary Examiner* — Hassan Phillips
*Assistant Examiner* — Prenell Jones
(74) *Attorney, Agent, or Firm* — The Farrell Law Firm, P.C.

(57) ABSTRACT

Disclosed is an apparatus and a method for receiving and playing Digital Multimedia Broadcasting (DMB) data using a DMB package and a mobile terminal. The DMB package is separable from the mobile terminal and can be interfaced with the mobile terminal. The apparatus includes DMB package for receiving DMB data, converting data formats of the received DMB data into multimedia data formats which can be reproduced by the typical mobile terminal, and transmitting the DMB data converted into the mobile terminal reproducible data formats to the mobile terminal. Accordingly, even a mobile terminal, which does not have a function of receiving and reproducing DMB data, can reproduce the DMB data.

38 Claims, 7 Drawing Sheets

DMB PACKAGE AND MOBILE TERMINAL FOR RECEIVING DMB DATA AND METHOD OF RECEIVING DMB DATA

PRIORITY

This application claims priority under 35 U.S.C. §119 to an application entitled "DMB Package and Mobile Terminal for Receiving DMB Data and Method of Receiving DMB Data" filed in the Korean Intellectual Property Office on Jul. 29, 2005 and assigned Serial No. 2005-69932, the contents of which are incorporated herein by reference.

BACKGROUND OF THE INVENTION

1. Field of the Invention

The present invention relates generally to digital multimedia broadcasting (DMB), and in particular, to a method and apparatus for receiving DMB data.

2. Description of the Related Art

In general, digital multimedia broadcasting (DMB) is a broadcasting service for providing high image quality, high sound quality, and a higher service to users by replacing conventional analog broadcasting. Recently, there has been an increased interest in a digital broadcasting service for watching a digital broadcasting program while moving according to the development of digital broadcasting technology and mobile communication technology. At present, an omni-directional DMB receive antenna is installed in a mobile terminal so that DMB data can be received. Hereinafter, a mobile terminal for receiving and reproducing DMB data will be referred to as a DMB receiving terminal.

The DMB receiving terminal includes components of a conventional mobile terminal and components for receiving and reproducing DMB data. The components for receiving and reproducing DMB data include a DMB receiving unit for receiving DMB data and a DMB module for decoding and reproducing the received DMB data. Thus, the DMB receiving terminal generally must include a modem module for a mobile communication function and the DMB module.

Thus, the DMB receiving terminal must include the DMB module and the DMB receiving unit besides the basic components of the mobile terminal. In addition, to implement portability, which is one of the most significant features of a mobile terminal, the DMB module and the DMB receiving unit must be miniaturized. Furthermore, since a controller of the mobile terminal must be also designed to operate with the DMB module, the system implementation cost of hardware and software required to implement all of the above-described objects is high.

In addition, since DMB receiving terminals have been commercially available for only a short period of time relative to conventional mobile terminals, at present, there are many more conventional terminals in use. However, since the general mobile terminal does not include the DMB module and the DMB receiving unit, users of the conventional mobile terminals (which do not have DMB capabilities) cannot watch a DMB program through their mobile terminals. Accordingly, if the users of conventional mobile terminals desire to watch a DMB program, they must use a DMB receiving terminal which can increase cost, and be inconvenient.

SUMMARY OF THE INVENTION

An object of the present invention is to substantially solve at least the above problems and/or disadvantages and to provide at least the advantages below. Accordingly, an object of the present invention is to provide an apparatus and method for allowing a user to watch a digital multimedia broadcasting (DMB) program using a general mobile terminal.

Another object of the present invention is to provide an apparatus and method for reducing the system implementation cost of hardware and software required to install a DMB module and a DMB receiving unit.

A further object of the present invention is to provide an apparatus and method for allowing a user to watch a DMB program using a mobile communication terminal or a mobile terminal such as a digital camera for reproducing a moving picture, a laptop computer, or a digital camcorder.

According to one aspect of the present invention, there is provided a DMB package including a DMB signal receiving unit for receiving DMB data; a DMB data converter for converting data formats of the DMB data received by the DMB signal receiving unit into data formats which can be reproduced by a mobile terminal; a DMB package interface unit, which is matched with the mobile terminal and interfaces with the mobile terminal; and a DMB package controller for controlling the DMB signal receiving unit and the DMB data converter to convert the data formats of the DMB data into the mobile terminal reproducible data formats and for outputting the DMB data converted into the mobile terminal reproducible data formats to the mobile terminal through the DMB package interface unit.

According to another aspect of the present invention, there is provided a mobile terminal including a key input unit having a plurality of keys; a display unit for displaying image information; an audible sound output unit for outputting audible sound; a terminal interface unit for interfacing with a DMB package; and a terminal controller for outputting a key input signal corresponding to a key, which is input through the key input unit, to the DMB package through the terminal interface unit, receiving DMB data from the DMB package, and reproducing the received DMB data.

According to another aspect of the present invention, there is provided a method for reproducing DMB data through a mobile terminal using a DMB package, the method including receiving, by the DMB package, the DMB data; determining whether a key input signal is input from the mobile terminal; if it is determined that the key input signal corresponds to a channel selection key (or keys), selecting a corresponding channel, receiving DMB data corresponding to the selected channel and converting data formats of the received DMB data into data formats according to set data format conversion; and outputting the converted DMB data to the mobile terminal.

According to another aspect of the present invention, there is provided a method for reproducing DMB data through a mobile terminal using a DMB package, the method including receiving, by the DMB package, the DMB data; determining whether a key input signal corresponding to a channel selection is input from the mobile terminal; if it is determined that the key input signal corresponds to a channel selection, receiving DMB data corresponding to the selected channel and converting data formats of the received DMB data into data formats according to set data format conversion; and outputting the converted DMB data to the mobile terminal.

According to another aspect of the present invention, there is provided a method of reproducing received DMB data in a mobile terminal, the method including if a DMB package is matched with the mobile terminal, recognizing, by the mobile terminal, the DMB package; outputting a key input signal according to a user's key input to the DMB package; receiving multimedia data of DMB data whose data formats have been converted into mobile terminal reproducible data formats, from the DMB package; and reproducing the received multimedia data in response to a control of the DMB package.

BRIEF DESCRIPTION OF THE DRAWINGS

The above and other objects, features and advantages of the present invention will become more apparent from the following detailed description when taken in conjunction with the accompanying drawing in which.

DETAILED DESCRIPTION OF THE PREFERRED EMBODIMENT

Figure 1:
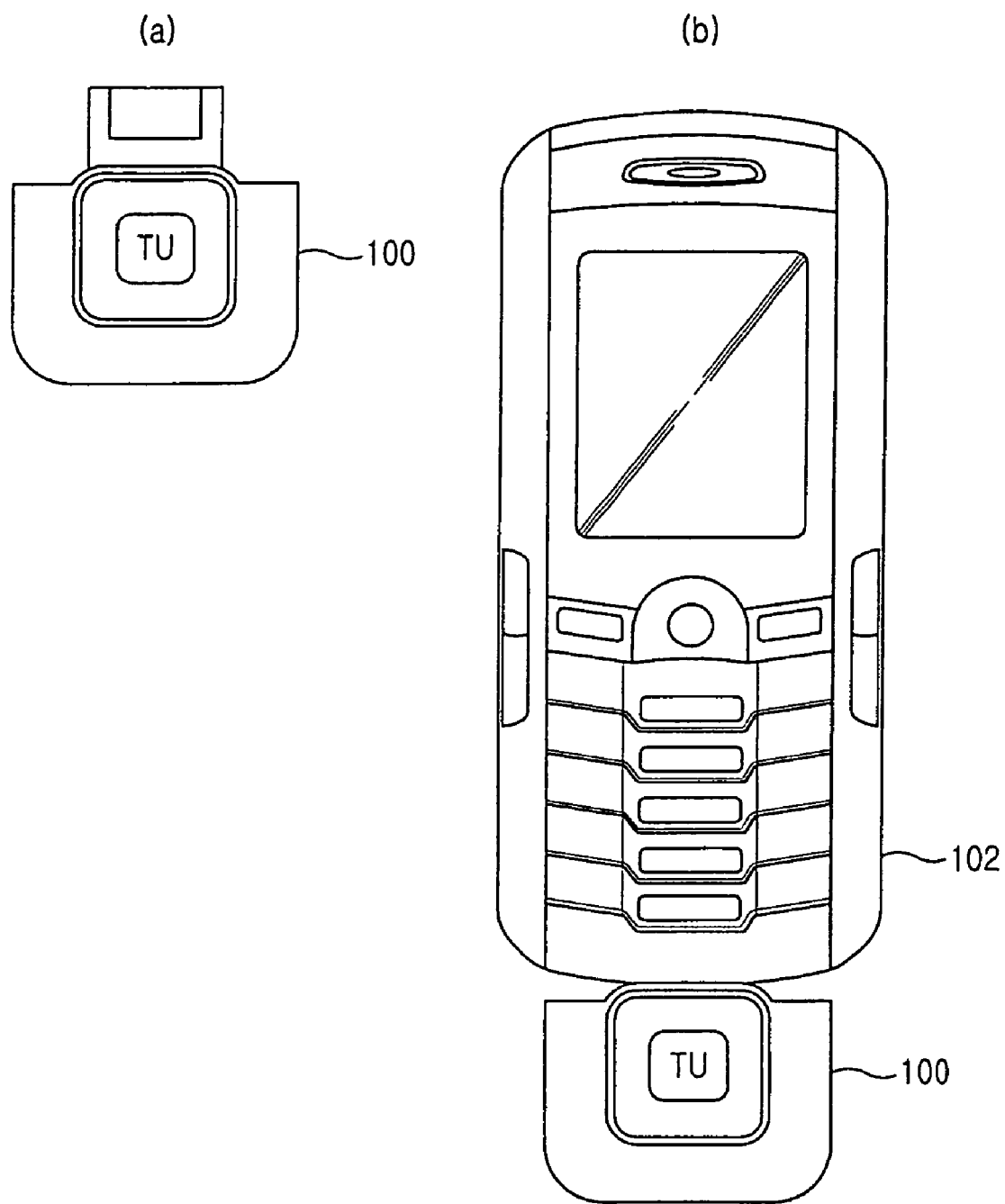
FIG. 1 is a top planar view illustrating a DMB package according to the present invention.

Preferred embodiments of the present invention will be described herein below with reference to the accompanying drawings. In the drawings, the same or similar elements are denoted by the same reference numerals even though they are depicted in different drawings. In the following description, well-known functions or constructions are not described in detail since they would obscure the invention in unnecessary detail.

The principles of the present invention will now be first described to more fully understand the objects and advantages of the present invention. The present invention includes a device separate from a mobile terminal and pluggable with the mobile terminal and a typical mobile terminal.

The device (i.e., the DMB package) according to the present invention receives DMB data, converts data formats of the received DMB data into video and audio data formats, which can be reproduced by a typical mobile terminal, and transmits the converted DMB data to the typical mobile terminal. Accordingly, even a mobile terminal, which does not have a function of receiving and reproducing DMB data, can reproduce the DMB data. Thus, even a user using a typical mobile terminal can watch a DMB program using the device according to the present invention.

Figure 2A:
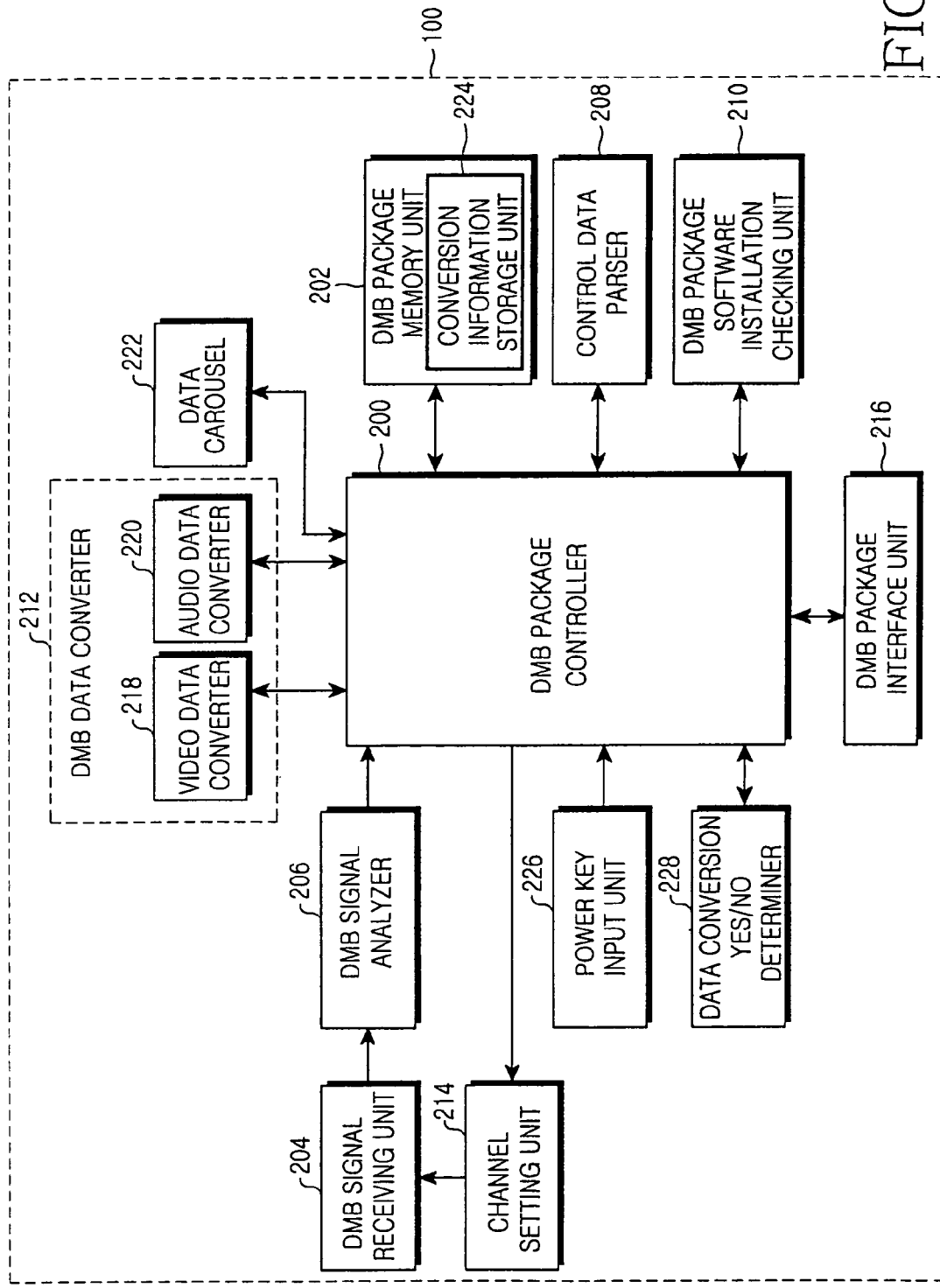
FIG. 2A is a block diagram illustrating the DMB package according to the present invention.
Figure 2B:
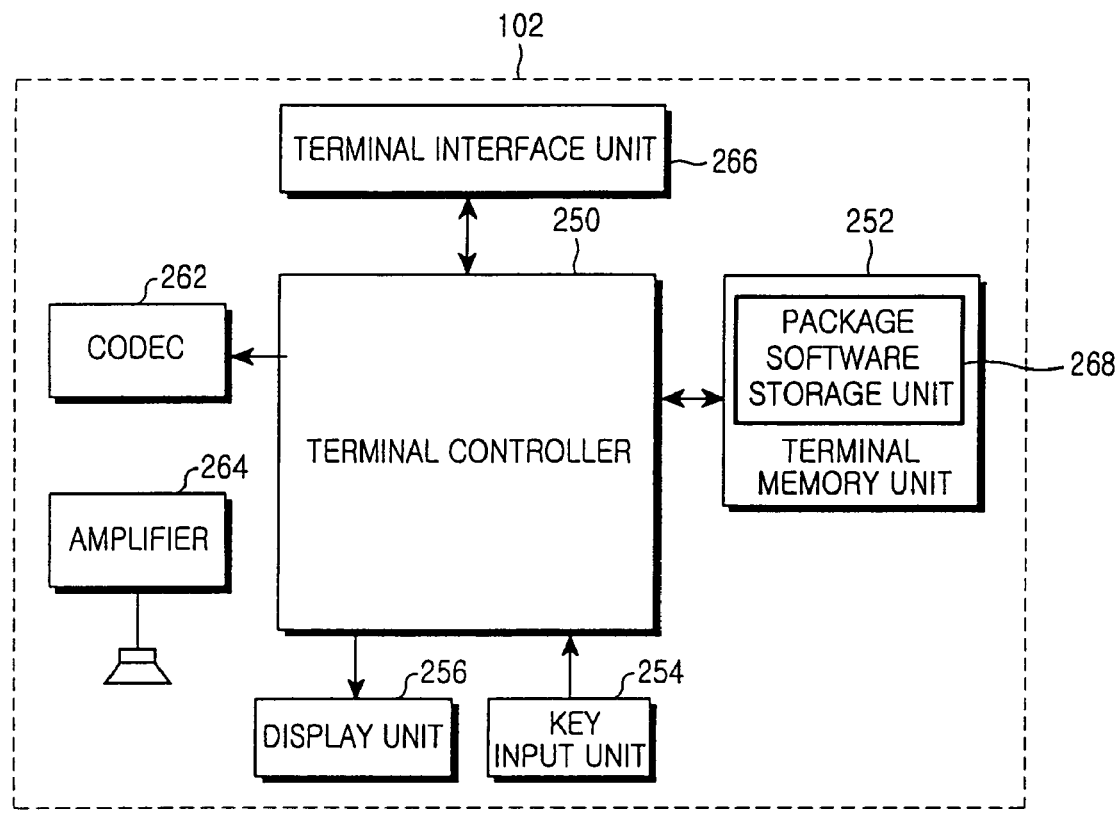
FIG. 2B is a block diagram illustrating the DMB package according to the present invention connected to a typical mobile terminal.

FIG. 1 is a top planar view illustrating a device for receiving and reproducing DMB data according to the present invention, FIG. 2A is a block diagram illustrating the device for receiving and reproducing DMB data according to the present invention, and FIG. 2B is a block diagram the device for receiving and reproducing DMB data according to the present invention connected to a mobile terminal 102. Hereinafter, the device for receiving and reproducing DMB data according to the present invention is called a DMB package for the sake of clarity.

Referring to FIG. 1A, a DMB package 100 includes a power on/off key (a "TU" key as shown in FIG. 1A, also known as a power key) and is connected to the mobile terminal 102 through an interface connector (not shown).

The mobile terminal 102 is a device, which can reproduce a moving picture, such as a mobile phone, a personal digital assistant (PDA), a laptop computer, or a digital camcorder. In general, the mobile terminal 102 has at least one data format for reproducing each of video and audio data. In addition, the mobile terminal 102 includes a Universal Serial Bus (USB) or Universal Asynchronous Receiver/Transmitter (UART) controller (not shown) for controlling an interface with a connected device according to the use of a USB or UART scheme.

In general, a serial port (not shown) uses a standardized 24-pin interface connector. If the mobile terminal 102 uses the USB or UART scheme for interfacing with an external device, the interface connector is matched with the serial port connected to the USB or UART controller of the mobile terminal 102. Hereinafter, a case where the mobile terminal 102 uses the USB scheme will be described for the sake of clarity. However, a case where the mobile terminal 102 uses the UART scheme also can be applied to the present invention.

Thus, the DMB package 100 can be connected to the mobile terminal 102 through the interface connector. FIG. 1(B) shows an illustration of the DMB package 100 connected to the mobile terminal 102 (e.g., a mobile phone).

Hereinafter, for the sake of clarity, the interface connector of the DMB package 100 is called a DMB package interface unit, and the USB controller of the mobile terminal 102 and the serial port connected to the USB controller are called a terminal interface unit.

FIG. 2A is a block diagram illustrating the DMB package 100 according to the present invention. The DMB package 100 includes a DMB package memory unit 202, a DMB signal analyzer 206, a DMB data converter 212, a data conversion yes/no determiner 228, a power key input unit 226, a DMB package interface unit 216, a control data parser 208, a DMB package software installation checking unit 210, and a channel setting unit 214, which are connected to a DMB package controller 200.

The DMB package interface unit 216 is connected to the DMB package controller 200 and interfaces the DMB package controller 200 and a controller of the mobile terminal 102.

The DMB package 100 determines whether DMB package software is installed in the mobile terminal 102. The DMB package software is software for interfacing the DMB package 100 and the mobile terminal 102 by providing compatibility between the mobile terminal 102 and the DMB package 100. The DMB package software may include a function of parsing broadcasting program information per channel (i.e., electronic program guide (EPG) data), of DMB and outputting the EPG data as image information. The DMB package software may include a function of checking multimedia data formats, which can be supported by the mobile terminal 102, according to the present invention. When the DMB package software is not installed in the mobile terminal 102, the DMB package controller 200 may inform a user of this or directly install the DMB package software in the mobile terminal 102.

If video and/or audio data included in DMB data is received from the DMB signal analyzer 206, the DMB package controller 200 converts data formats of the received video and audio data into video and/or audio data formats, which can be reproduced by the mobile terminal 102 and transmits the converted video and/or audio data formats, which can be reproduced and output by the mobile terminal 102, to the mobile terminal 102.

If information data is received from the DMB signal analyzer 206, the DMB package controller 200 provides the received information data to a data carousel 222, outputs information data selected through the data carousel 222 by the user to the mobile terminal 102, and controls the mobile terminal 102 to display the information data as image information. Then, the mobile terminal 102 can reproduce the video and/or audio data of the DMB data or output the information data as the image information.

If control data is received from the DMB signal analyzer 206, the DMB package controller 200 outputs the received control data to the control data parser 208 and controls the control data parser 208 to parse the control data. Then, the DMB package controller 200 generates DMB channel configuration information using the parsed control data and outputs the generated channel configuration information to the channel setting unit 214. The DMB channel configuration information is information on code division multiplexing (CDM) channels allocated to broadcasting channels, such as CDM channel information of satellite DMB.

If broadcasting program information per channel of DMB is received from the DMB signal analyzer 206, the DMB package controller 200 outputs the received broadcasting program information per channel to the mobile terminal 102. Then, the mobile terminal 102 determines whether the user selects a key for outputting EPG data. If the user selects the key for outputting EPG data, the mobile terminal 102 parses the broadcasting program information per channel. The mobile terminal 102 may use the DMB package software for parsing the broadcasting program information per channel. Thereafter, the mobile terminal 102 outputs the parsed broadcasting program information per channel as image information. Thus, the mobile terminal 102 can provide information on channels of the DMB data to the user as image information.

A DMB signal receiving unit 204 includes an antenna (not shown) for receiving DMB data, a radio frequency (RF) unit (not shown), and a baseband processing unit (not shown). The DMB signal receiving unit 204 receives DMB data according to a channel set by the channel setting unit 214 and outputs the received DMB data to the DMB signal analyzer 206.

The DMB signal analyzer 206 connected to the DMB package controller 200 extracts video data, audio data, information data, control data, and broadcasting program information per channel by analyzing the DMB data received from the DMB signal receiving unit 204 and outputs the extracted video data, audio data, information data, control data, and broadcasting program information per channel to the DMB package controller 200.

The control data parser 208 parses the control data including program specification information (PSI), such as a service description table (SDT), a program association table (PAT), and a program map table (PMT), input from the DMB package controller 200 and outputs the parsed control data to the DMB package controller 200. Then, the DMB package controller 200 outputs the parsed control data to the channel setting unit 214 as channel configuration information.

The channel setting unit 214 confirms a configuration of DMB channels using the channel configuration information generated by the control data parser 208. If a key for channel selection is selected by the user, the DMB package controller 200 controls the channel setting unit 214 to set a channel according to the key for channel selection, which is selected by the user, into the DMB signal receiving unit 204.

A method of setting a channel in the channel setting unit 214 can vary according to a type of DMB received by the DMB package 100. That is, for example, if the DMB package 100 receives a satellite DMB program, the channel setting unit 214 may set a channel by generating a Walsh code map using the channel configuration information input from the DMB package controller 200, selecting a Walsh code according to the channel set by the user, and outputting the selected Walsh code to the DMB signal receiving unit 204 to set the selected Walsh code into the DMB signal receiving unit 204. If the DMB package 100 receives a terrestrial DMB program, the channel setting unit 214 may set a channel by outputting an Ensemble frequency selected by the user into the DMB signal receiving unit 204.

The DMB package software installation checking unit 210 connected to the DMB package controller 200 determines whether DMB package software is installed in the mobile terminal 102 in response to a control of the DMB package controller 200. The DMB package controller 200 informs the user of the result of determining whether the DMB package software is installed in the mobile terminal 102.

As described above, the DMB package software is software for interfacing the DMB package 100 and the mobile terminal 102 by providing compatibility between the mobile terminal 102 and to the DMB package 100. The DMB package software may include a function of parsing information data and broadcasting program information per channel and outputting the parsed information data and broadcasting program information per channel as image information besides the interfacing function. The DMB package 100 can inform the user of the determination result (i.e., the result of the determination of whether DMB package software is installed in the mobile terminal 102) through image information using a display unit of the mobile terminal 102. If it is determined that the DMB package software is not installed in the mobile terminal 102, the user can download the DMB package software by accessing a wireless network in a case where the mobile terminal 102 can access the wireless network or accessing a device such as a personal computer (PC). However, in alternative embodiments, the user can update or download the DMB package software, regardless of the determination's result.

Moreover, the DMB package software installation checking unit 210 may have installation data of the DMB package software, in which this case, if it is determined that the DMB package software is not installed in the mobile terminal 102, the DMB package controller 200 may install the DMB package software in the mobile terminal 102 using the installation data of the DMB package software prepared in the DMB package software installation checking unit 210.

The DMB package memory unit 202 connected to the DMB package controller 200 includes a Read Only Memory (ROM), a flash memory, and a Random Access Memory (RAM). The ROM stores programs and various types of reference data for processing and controls of the DMB package controller 200. The RAM provides a working memory space of the DMB package controller 200, and the flash memory provides a space for storing various kinds of updatable storage data. In addition, when information on reproducible multimedia data formats is received from the mobile terminal 102, the DMB package controller 200 stores the received information in the flash memory.

When DMB data is received, the DMB package memory unit 202 stores conversion information used to convert data formats of multimedia data included in the received DMB data into the mobile terminal reproducible data formats. Herein, an area of the DMB package memory unit 202 in which the conversion information is stored, is called a conversion information storage unit 224.

The DMB package controller 200 controls the DMB data converter 212 connected to the DMB package controller 200 to convert one or both of data formats of the video data and/or the audio data of the received DMB data into a data format, which can be reproduced and output by the mobile terminal 102. To do this, the DMB data converter 212 includes at least one of a video data converter 218 and an audio data converter 220.

The video data converter 218 converts a data format of the video data of the DMB data into a video data format, which can be reproduced by the mobile terminal 102. For example, it is assumed that DMB is satellite DMB and the mobile terminal 102 supports only an MPEG-4 data format.

In this case, the video data of the DMB data has an MPEG-4 AVC (Advanced Video Coding, H.264/MPEG-4 part-10) data format (hereinafter, an H.264 data format) according to a satellite DMB standard. Then, the video data converter 218 converts the video data according to the H.264 data format into video data according to the MPEG-4 data format using the conversion information stored in the conversion information storage unit 224. The DMB package controller 200 outputs the video data converted into the MPEG-4 data format to the mobile terminal 102. Thus, the mobile terminal 102 can reproduce the video data of the DMB data. However, if the mobile terminal 102 can reproduce video data according to the H.264 data format, the video data converter 218 may not perform the video data format conversion. In this case, the video data converter 218 may not be included. Although the above-description is related to satellite DMB, the current embodiment also can be applied to terrestrial DMB using the H.264 data format.

The operation of the audio data converter 220 is similar to the operation of video data converter 218 with a difference being that the audio data converter 220 operates on audio data (e.g., MPEG-2) as opposed to video data (e.g., H.264 data). For example, it is assumed that DMB is satellite DMB and the mobile terminal 102 supports only an audio data format different from that according to the satellite DMB standard.

In this case, the audio data of the DMB data has an MPEG-2 AAC+ (Advanced Audio Codec) SER (Spectral Band Replication) data format (hereinafter, an AAC+ data format) according to the satellite DMB standard. Then, the audio data converter 220 converts the audio data according to the AAC+ data format into audio data according to a mobile terminal reproducible data format. The DMB package controller 200 outputs the converted audio data to the mobile terminal 102. Thus, the mobile terminal 102 can reproduce the audio data of the DMB data. However, if the mobile terminal 102 can reproduce audio data according to the AAC+ data format, the audio data converter 220 may not perform the audio data format conversion. Accordingly, if it is determined that the mobile terminal 102 can reproduce audio data according to the AAC+ data format, the audio data converter 220 may not be used (or included).

In the above-described case, since satellite DMB is illustrated as DMB, the AAC+ data format, which is an audio data format according to the satellite DMB standard, has been described. However, audio data of the AAC+ data format may also be reproduced by a typical mobile phone depending upon the mobile phone's configuration and options. That is, when the DMB package 100 according to the current embodiment receives a satellite DMB program, if the mobile terminal 102 is a mobile phone which can receive the AAC+ data format, the audio data converter 220 may not be necessary.

However, if DMB is terrestrial DMB, audio data of an MPEG-4 BSAC (Bit Sliced Arithmetic Coding) data format (hereinafter, a BSAC data format) according to a terrestrial DMB standard is received. In this case, a current typical mobile phone cannot reproduce the audio data of the BSAC data format. Thus, in this case, the audio data converter 220 is necessary for converting the audio data of the BSAC data format into audio data of the AAC+ data format, and thereby allowing the current typical mobile phone to reproduce the audio data according to the terrestrial DMB standard.

If information data is included in DMB data according to a channel selected by the user, the information data is transmitted from the DMB signal analyzer 206 to the data carousel 222 by a control of the DMB package controller 200. Then, the data carousel 222 receives the information data. If the user selects a key for outputting information data, the DMB package controller 200 controls the data carousel 222 to output the information data of the DMB channel selected by the user to the mobile terminal 102. Then, the mobile terminal 102 outputs the information data as image information using the DMB package software. Accordingly, the DMB package 100 according to the current embodiment can provide not only multimedia data of corresponding DMB data, but also information data to the user.

The DMB package 100 converts multimedia data of received DMB data into multimedia data according to data formats, which can be reproduced by the mobile terminal 102. In this case, the DMB package 100 may request from the user (or from the mobile terminal 102) unique information of the mobile terminal 102 or information on multimedia data formats, which can be reproduced by the mobile terminal 102, and set conversion of DMB data according to information input by the user or received by the mobile terminal 102.

In addition, the DMB package 100 may directly request the mobile terminal 102 for information on multimedia data formats, which can be reproduced by the mobile terminal 102, and convert data formats of received multimedia data into the multimedia data formats, which can be reproduced by the mobile terminal 102. To do this, the DMB package 100 may include the data conversion yes/no determiner 228. In this case, the DMB package controller 200 controls the data conversion yes/no determiner 228 to request from the mobile terminal 102 information on video and audio data formats, which can be reproduced by the mobile terminal 102. If the data format information is received from the mobile terminal 102, the data conversion yes/no determiner 228 compares the data format information received from the mobile terminal 102 to the conversion information stored in the DMB package memory unit 202. Then, the data conversion yes/no determiner 228 determines whether the DMB data can be converted according to multimedia data formats supported by the mobile terminal 102. According to the determination result, the data conversion yes/no determiner 228 determines data formats to be used to convert the DMB data. Thus, when the data conversion yes/no determiner 228 is included in the DMB package 100, in the current embodiment, the data conversion yes/no determiner 228 can request from the mobile terminal 102 multimedia data format information, which can be reproduced by the mobile terminal 102, and convert data formats of DMB data into mobile terminal reproducible data formats using the multimedia data format information received in response to the request.

FIG. 2B is a block diagram illustrating the DMB package 100 according to the present invention connected to a typical mobile terminal. The mobile terminal 102 includes a typical PDA, a typical mobile phone, a typical laptop computer, or the like. However, the mobile terminal 102 should have a display unit, such as a liquid crystal display (LCD) display device, for reproducing format converted video data of DMB data, a key input unit for transmitting a key input signal for selecting a channel and receiving the DMB data to the DMB package 100, and an audible sound output unit, e.g., a speaker (or speaker output port), for outputting an audible sound signal by reproducing audio data input from the DMB package 100. The mobile terminal 102 includes a terminal interface unit 266, a terminal memory unit 252, a key input unit 254, a display unit 256, a codec 262, and an amplifier 264, which are connected to a terminal controller 250.

The terminal interface unit 266 is connected to the terminal controller 250 and includes a serial port (not shown) to be matched with the DMB package interface unit 216 and/or a USB controller (not shown) if the mobile terminal 102 uses the USB scheme or a UART controller (not shown) if the mobile terminal 102 uses the UART scheme. The terminal interface unit 266 interfaces the terminal controller 250 with the DMB package controller 200 (shown in FIG. 2A). The terminal controller 250 controls the display unit 256 to display received data as image information.

The terminal controller 250 controls every component of the mobile terminal 102. The terminal controller 250 receives a key input signal from the key input unit 254 and outputs the received key input signal to the DMB package 100. The terminal controller 250 also decodes video data and audio data input from the DMB package 100 using the codec 262 and outputs the decoded audio and video data through the amplifier 264 and a speaker 270 and the display unit 256 in response to a control of the DMB package controller 200.

If the user wants to see information data, the terminal controller 250 outputs information data received from the DMB package 100 as image information using DMB package software. If the user wants to see EPG data, the terminal controller 250 receives broadcasting program information per channel of DMB from the DMB package 100, parses the received broadcasting program information per channel using the stored DMB package software, and outputs the parsed broadcasting program information per channel as image information using the stored DMB package software. The DMB package software may be installed in the mobile terminal 102 by receiving installation data of the DMB package software from the DMB package 100 or by downloaded from a wired or wireless network, such as a mobile communication network, or a server of a specific service provider according to a user's selection.

The terminal memory unit 252 connected to the terminal controller 250 includes a ROM, a flash memory, and a RAM. The ROM stores programs and various kinds of reference data for processing and for controlling the terminal controller 250. The RAM provides a working memory space of the terminal controller 250, and the flash memory provides a space for storing various kinds of updatable storage data. In addition, the terminal memory unit 252 of the mobile terminal 102 has an area in which the DMB package software provided by the DMB package 100, the wireless network, or the service provider is stored. Hereinafter, the area of the terminal memory unit 252 in which the DMB package software is stored is called a DMB package software storage unit 268.

The codec 262 decodes video and audio signals input from the terminal controller 250 and outputs the decoded video and audio signals back to the terminal controller 250. The key input unit 254 includes various keys including numeric keys (and/or Alphabetical Keys, Function, or Shortcut Keys) as described above and provides a key input signal corresponding to a key selected by the user to the terminal controller 250. The amplifier 264 connected to the terminal controller 250 is connected to the speaker and outputs audio data input from the terminal controller 250 to the speaker. The amplifier 264 also amplifies a voice signal output to the speaker and controls the volume of the speaker in response to a control of the terminal controller 250.

Thus, if the user uses the DMB package 100 according to a preferred embodiment of the present invention, the user can watch a DMB program using the mobile terminal 102, which does not have a DMB function, such as a typical mobile phone, a typical PDA, or a typical laptop computer. In this case, the user can select a desired channel using the key input unit 254 of the mobile terminal 102. In addition, the user can select to display EPG data or information data of DMB data using the key input unit 254.

Operations of providing DMB data and outputting EPG data according to a user's selection using the DMB package 100 and the typical mobile terminal 102 will now be described in detail with reference to FIGS. 3 and 5.

Figure 3:
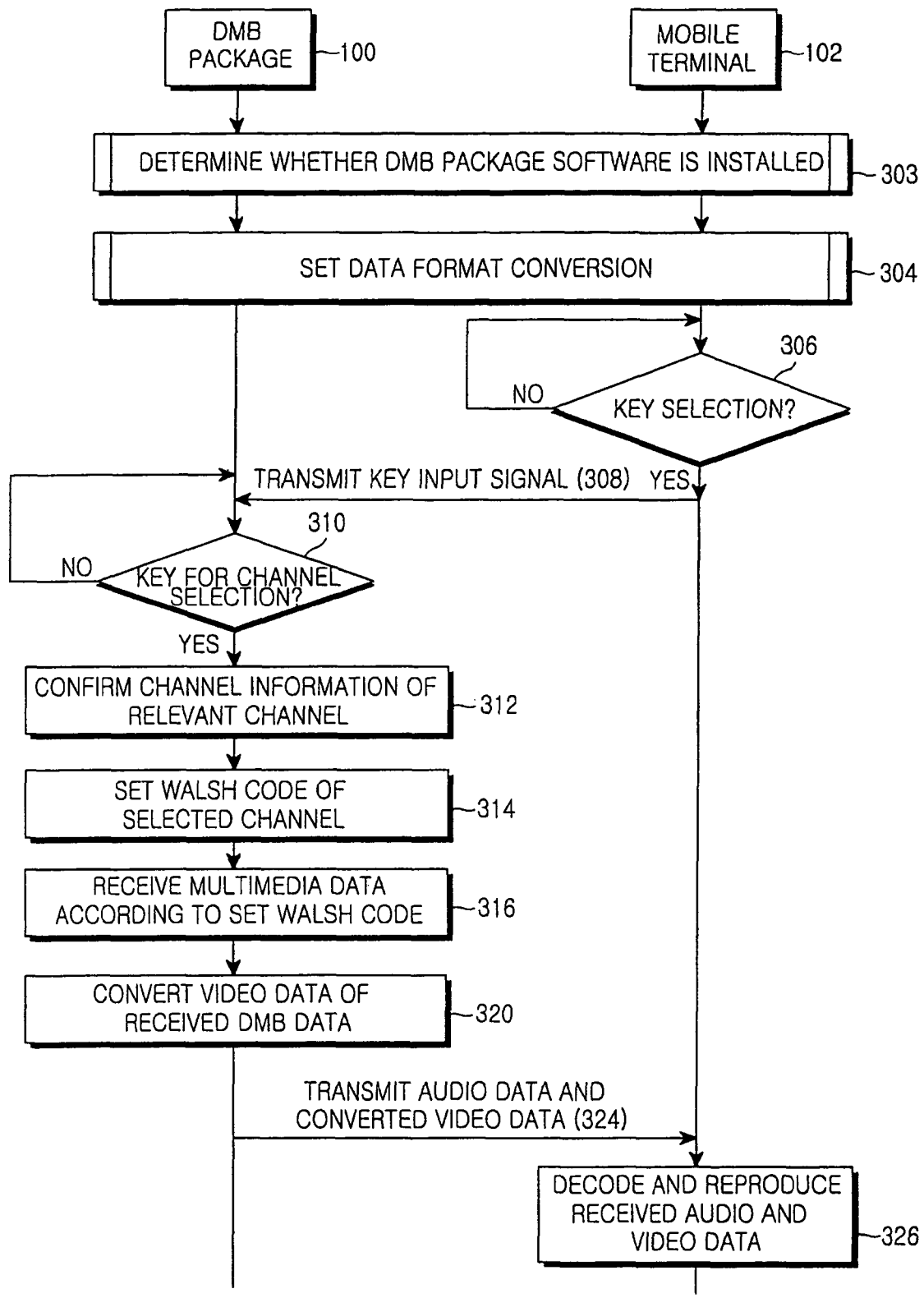
FIG. 3 is a flow diagram illustrating an operation of reproducing DMB data in the typical mobile terminal using the DMB package according to the present invention.

FIG. 3 is a flow diagram illustrating an operation of reproducing DMB data in the typical mobile terminal 102 using the DMB package 100 according to the present invention. It is assumed that the DMB package 100 illustrated in FIG. 3 uses the Walsh code to set a channel selected by the user. It is also assumed that a mobile phone which can support the AAC+ audio data format and the MPEG-4 video data format is used as the mobile terminal 102. It is assumed that DMB is satellite DMB using the H.264 video data format and the AAC+ audio data format. It is also assumed that the DMB package 100 according to the current embodiment includes the data conversion yes/no determiner 228.

Referring to FIG. 3, when a power key input signal is input from the power key input unit 226, in step 303, the DMB package 100 determines whether the DMB package software is installed in the mobile terminal 102. Then, the DMB package 100 informs the user of the determination result using a display unit and/or an alarm unit such as the mobile terminal's 102 display 256 and/or speaker 270, respectively. If the DMB package 100 can install the DMB package software in the mobile terminal 102, the DMB package 100 may install the DMB package software in the mobile terminal 102. However, if it is determined that the DMB package software cannot be installed in mobile terminal 102, the DMB package 100 informs the user of the determination result using the display unit and/or an alarm unit such as the display unit 256 and/or the speaker 270, respectively. In the case of step 303, it is assumed that the DMB package 100 installs the DMB package software in the mobile terminal 102 according to the determination result. The case of step 303 will be described in more detail with reference to FIG. 4A below.

In step 304, the DMB package 100 requests from the mobile terminal 102 information on multimedia data formats supported by the mobile terminal 102 and sets data format conversion of the DMB data converter 212 according to the multimedia data formats received in response to the request. Since (for the sake of clarity) it is assumed that the mobile phone supports the MPEG-4 and AAC+ data formats, the data format conversion is set to convert a data format of video data into the MPEG-4 data format and not to convert audio data.

The DMB package 100 may have various methods of setting the data format conversion according to the mobile terminal 102. For example, the DMB package 100 may determine supportable multimedia data formats according to a model (e.g. a model type, etc.) of the mobile terminal 102 by receiving unique information relating to the mobile terminal 102 from the terminal controller 250. This case as step 304 will be described in more detail with reference to FIG. 4B below.

When the data format conversion is set in step 304, in step 306, the mobile terminal 102 determines whether a key is selected by the user. If a key is selected by the user, in step 308, the mobile terminal 102 transmits a key input signal corresponding to the selected key to the DMB package 100 through the interface units 216 and 266 which are interfaced with each other. Herein, the key input signal of the mobile terminal 102 may be converted to a signal, which can be recognized by the DMB package 100, by the DMB package software installed in the mobile terminal 102 and transmitted to the DMB package 100.

In step 310, the DMB package 100 receives the key input signal and determines whether the received key input signal is a key input signal for selecting a channel. The DMB package 100 has various methods of determining whether the received key input signal is the key input signal for selecting a channel. For example, if a numeric key is selected, the DMB package 100 may determine that the user selects a channel number of a specific channel.

If the DMB package 100 determines that the user has selected a key for selecting a channel as the determination result of step 310, in step 312, the DMB package 100 confirms a channel corresponding to the channel number selected by the user from the channel configuration information using the channel setting unit 214. The channel configuration information includes information on unique IDs of channels, information on PMT packet identifications (PIDs) corresponding to the channels, and information on Packet Element Stream (PES) PIDs of video, audio, and information data according to the channels. The channel configuration information is generated by parsing control data included in the DMB data.

When the DMB package 100 confirms information on the channel corresponding to the channel number selected by the user in step 312, in step 314, the DMB package 100 sets a Walsh code according to a PES PID of the channel selected by the user using the DMB signal receiving unit 204. Then, the DMB signal receiving unit 204 filters and receives only DMB data according to the set Walsh code. In step 316, the DMB package 100 receives only DMB data according to the Walsh code of the channel set by the user.

In step 320, the DMB package 100 converts a data format of video data of the received DMB data according to the data format conversion set in step 304. After the data format of the video data is converted according to the set data format conversion, in step 324, the DMB package 100 transmits audio data and the converted video data to the mobile terminal 102. A data format of the audio data is not converted because the audio data converter 220 of the DMB package 100 does not have to convert the data format of the audio data in the case where the audio data of the DMB data has the AAC+ data format since the mobile terminal 102, i.e., the mobile phone, can reproduce audio data of the AAC+ data format according to the assumption.

In step 326, the mobile terminal 102 reproduces the DMB data by decoding the received audio and video data and outputting the decoded audio and video data to the amplifier 264 and the display unit 256.

Thus, according to the current embodiment, even a typical mobile terminal, which does not have the function of receiving and reproducing DMB data, can receive and reproduce DMB data using the DMB package 100 according to a preferred embodiment of the present invention. Accordingly, the user can watch a DMB program anytime using the currently carrying typical mobile terminal 102.

Figure 4A:
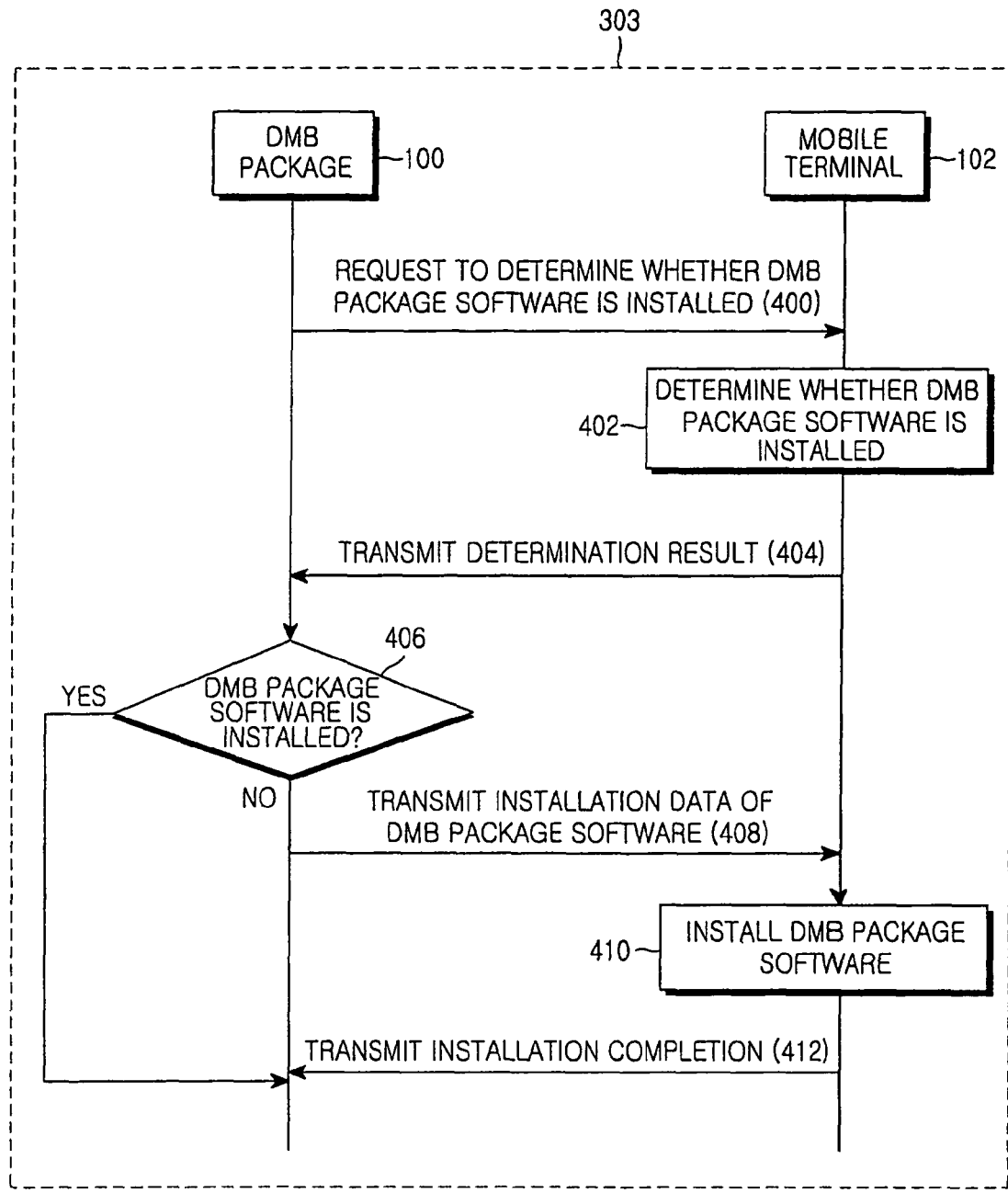
FIG. 4A is a flow diagram illustrating an operation of the DMB package installing DMB package software in the typical mobile terminal, according to the present invention.

FIG. 4A is a flow diagram illustrating an operation of the DMB package according to the present invention installing DMB package software in a typical mobile terminal. According to the present invention, the DMB package 100 may install the DMB package software in the mobile terminal 102, if it is capable of doing so. Referring to FIG. 4A, when power is on, in step 400, the DMB package 100 according to the present invention transmits, to the mobile terminal 102, a request message for determining whether the DMB package software is installed in the mobile terminal 102.

In step 402, the mobile terminal 102 determines whether the DMB package software is stored therein. In step 404, the mobile terminal 102 transmits the determination result to the DMB package 100. In step 406, DMB package 100 determines whether to install the DMB package software in the mobile terminal 102 according to the determination result of step 402.

If installation of the DMB package software is necessary according to the determination result of step 406, in step 408, the DMB package 100 transmits installation data of the DMB package software to the mobile terminal 102. In step 410, the mobile terminal 102 receives the installation data of the DMB package software and installs the DMB package software in response to a control of the DMB package 100. When the installation of the DMB package software is completed, in step 412, the mobile terminal 102 transmits a message informing the DMB package 100 of the completion of the installation of the DMB package software. Thus, even if the mobile terminal 102 does not have the DMB package software, the mobile terminal 102 can install the DMB package software using the DMB package 100, according to the present invention.

Figure 4B:
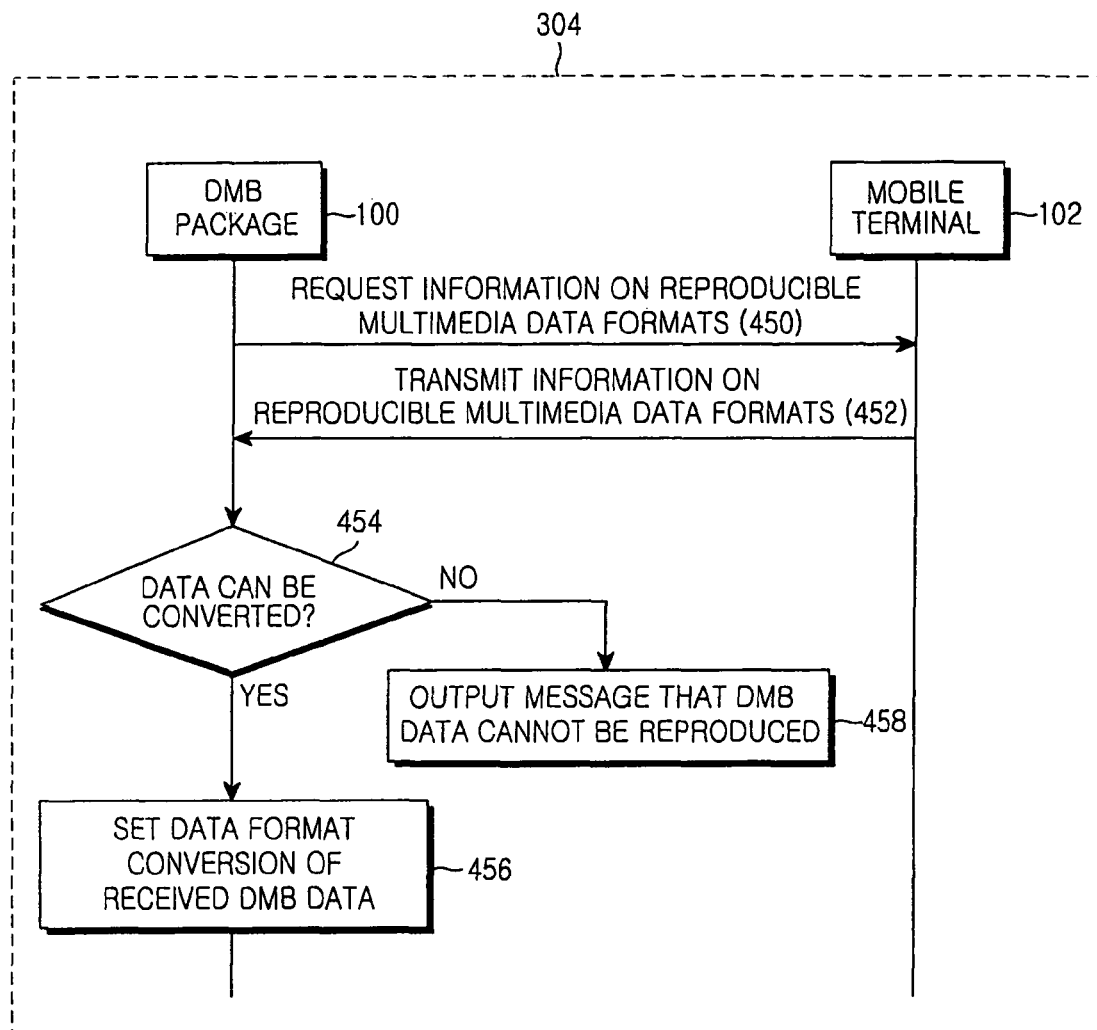
FIG. 4B is a flow diagram illustrating an operation of the DMB package determining a format of media data to be converted according to multimedia reproduction resources of the typical mobile terminal, according to the present invention.

FIG. 4B is a flow diagram illustrating an operation of the DMB package determining a format of media data to be converted according to multimedia reproduction resources of a typical mobile terminal according to the present invention. It is assumed that the DMB package 100 according to the present invention can include the data conversion yes/no determiner 228. Accordingly, the data conversion yes/no determiner 228 determines mobile terminal reproducible multimedia data formats from the mobile terminal 102. Then, the DMB package 100 sets data format conversion of multimedia data according to the data formats, which can be reproduced by the mobile terminal 102. FIG. 4B illustrates an operation of the DMB package 100 determining a format of media data to be converted according to multimedia reproduction resources of the mobile terminal 102 based on the above-described assumption.

Referring to FIG. 4B, if the installation of the DMB package software is completed through the process illustrated in FIG. 4A, in step 450, the DMB package 100 requests, from the mobile terminal 102, supportable multimedia data format information. The supportable multimedia data format information includes information on a video data format and an audio data format, which can be reproduced by the mobile terminal 102.

In step 452, the mobile terminal 102, which has been requested for the supportable multimedia data format information from the DMB package 100 in step 450, transmits video and audio data format information, which can be reproduced using currently prepared multimedia reproduction resources, to the DMB package 100. In step 454, the DMB package 100 determines whether DMB data can be converted into data according to the received multimedia data format information. Herein, in step 454, the DMB package 100 may determine whether conversion information corresponding to the received multimedia data format information is stored in the conversion information storage unit 224.

If the DMB data cannot be converted into data according to the received multimedia data format information as the determination result of step 454, in step 458, the DMB package 100 transmits a message for informing that the DMB data cannot be reproduced to the mobile terminal 102. If the DMB data can be converted into data according to the received multimedia data format information as the determination result of step 454, in step 456, the DMB package 100 sets data format conversion of the DMB data. Accordingly, if the DMB data is received thereafter, data formats of video and audio data of the DMB data can be converted into data formats, which can be reproduced by the mobile terminal 102, using the set data format conversion.

As described above, if the DMB package 100 according to a preferred embodiment of the present invention is used, the user can watch a DMB program using a typical mobile terminal. However, to reproduce the DMB program, besides a function of receiving and reproducing DMB data, a function of providing broadcasting program information per channel, i.e., EPG data, of DMB to the user is also requisite. In a typical DMB receiving terminal, when a DMB module for receiving and reproducing DMB data receives the EPG data, the DMB module decodes the received EPG data according to a user's selection and outputs the decoded EPG data to a display unit of the typical DMB receiving terminal. However, since a typical mobile terminal does not have the function of receiving DMB data, the typical mobile terminal naturally does not have a function of displaying EPG data. However, the DMB package 100 according to a preferred embodiment of the present invention may output EPG data to the mobile terminal 102 so that EPG data can be displayed. As described above, in the DMB package 100 according to the present invention, the DMB package software for interfacing between the mobile terminal 102 and the DMB package 100 may have a function of parsing the broadcasting program information per channel and outputting the parsed broadcasting program information per channel as image information. Accordingly, if the DMB package software has the function of parsing the broadcasting program information per channel and outputting the parsed broadcasting program information per channel as image information, the mobile terminal 102 according to a preferred embodiment of the present invention can output the broadcasting program information per channel as image information using the DMB package software.

Figure 5:
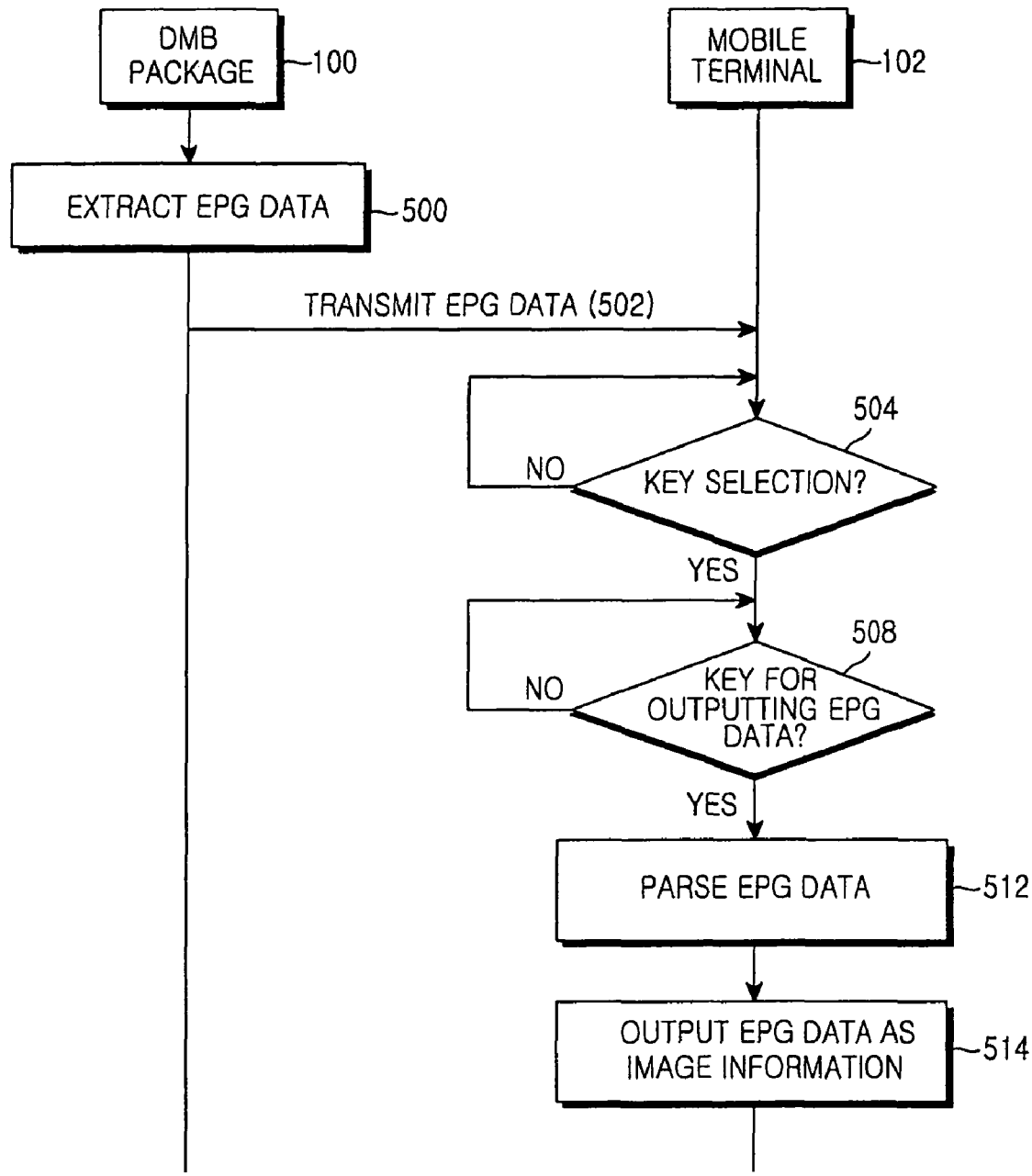
FIG. 5 is a flow diagram illustrating an operation of providing broadcasting program information per channel to a user when DMB package software includes a function of parsing and outputting the broadcasting program information per channel, according to the present invention.

FIG. 5 is a flow diagram illustrating an operation of providing broadcasting program information per channel to the user when the DMB package software has the function of parsing and outputting the broadcasting program information per channel according to the present invention. When DMB data is received, in step 500, the DMB package 100 according to the present invention extracts broadcasting program information per channel from the received DMB data. It is assumed that the broadcasting program information per channel is EPG data.

In step 502, the DMB package 100 transmits the extracted EPG data to the mobile terminal 102. In step 504, the mobile terminal 102 determines whether a key is selected by the user. If a key is selected by the user in step 502, in step 508, the mobile terminal 102 determines whether the key selected in step 504 is a key for outputting EPG data. The key for outputting EPG data may be a key pre-set when the DMB package software is produced or be selected by the user using a specific setting menu. For example, the key may be a soft key.

If it is determined that the key selected in step 504 is a key for outputting EPG data as the determination result of step 508, in step 512, the mobile terminal 102 parses the EPG data received in step 502 using the DMB package software. In step 514, the mobile terminal 102 outputs the parsed EPG data as image information on the display unit 256.

Thus, the DMB package 100 according to a preferred embodiment of the present invention allows the mobile terminal 102 to display the EPG data as image information. Accordingly, the user can use the EPG data through even a typical mobile terminal. Although only the EPG data is output in FIG. 5, if the DMB package software has a function of parsing information data of DMB and outputting the parsed information data as image information, the information data can be provided to the user as image information in a similar process. That is, the DMB package 100 receives information data of a channel selected by the user using the data carousel 222 and transmits the received information data to the mobile terminal 102. When a key is selected by the user, if it is determined that the selected key is a key for outputting information data, the mobile terminal 102 outputs the received information data as image information using the DMB package software. Accordingly, the information data of DMB can also be provided to the user, according to the present invention.

As described above, according to the present invention, even a mobile terminal, which does not have a function of receiving and reproducing DMB data, can reproduce the DMB data. Thus, even a user using a typical mobile terminal can watch a DMB program and/or review EPG data using an apparatus according to a preferred embodiment of the present invention.

While the invention has been shown and described with reference to a certain preferred embodiments thereof, it will be understood by those skilled in the art that various changes in form and details may be made therein without departing from the spirit and scope of the invention. In particular, although a PDA, a mobile phone, and a laptop computer have been described as examples of a mobile terminal, the present invention is not limited to these examples. In addition, a DMB package has confirmed information on data conversion formats from the mobile terminal and converted video data and audio data of DMB data according to the information. However, if the mobile terminal can convert video data and audio data of various data formats, the DMB package can allow a user to select each one of the various video data formats and audio data formats through a setting menu provided by the mobile terminal.

Additionally, the DMB package may provide a premium channel service. Unlike general channels that DMB subscribers can watch, the premium channel is a channel through which a user can watch a pay DMB program through a separate subscription process only if the user wants to watch the pay DMB program based on individual subscriber's interest. In this case, if a user who is not authorized for a specific premium channel selects the specific premium channel, the DMB package can inform the user that the user is not authorized for the premium channel service. In this case, the DMB package can transmit a message for informing the user of the fact to the mobile terminal, and then, the mobile terminal can inform the user of the fact by displaying a pop-up window on a display unit. In addition, the pop-up window can include a message for asking whether the user subscribes for the premium channel service. If the user subscribes for the premium channel service, the DMB package can receive DMB data of a channel corresponding to the premium channel service and reproduce the received DMB data. In yet other alternative embodiments, a pay channel or pay-per-view program can be ordered using the mobile terminal's transmit/receive capabilities and the selected channel or program can be viewed using the mobile terminal's display Thus, the spirit and scope of the invention will be defined by the appended claims.

What is claimed is:

1. A digital multimedia broadcasting (DMB) package comprising:
   a DMB signal receiving unit for receiving the DMB data;
   a DMB data converter for converting data formats of the DMB data received by the DMB signal receiving unit into data formats which can be reproduced by a mobile terminal interfaced thereto;
   a DMB package interface unit for interfacing with the mobile terminal;
   a DMB package controller for controlling the DMB signal receiving unit and the DMB data converter to convert the data formats of the DMB data into the mobile terminal reproducible data formats and output the DMB data converted into the mobile terminal reproducible data formats to the mobile terminal through the DMB package interface unit; and
   a DMB package software installation checking unit for determining whether DMB package software for allowing the mobile terminal and the DMB package to interface and be compatible with each other is installed in the mobile terminal,
   wherein the DMB package software provides the mobile terminal with the ability to parse the information data and the broadcasting program information per channel of the DMB data and output the parsed information data and broadcasting program information as image information.

2. The DMB package of claim 1, further comprising a channel setting unit for receiving channel information from a key input unit of the mobile terminal and controlling the DMB signal receiving unit to receive DMB data of a channel according to the channel information.

3. The DMB package of claim 1, further comprising:
   a DMB signal analyzer for identifying multimedia data and channel configuration information from the DMB data received from the DMB signal receiving unit; and
   a DMB package memory unit for storing conversion information used to convert data formats of the multimedia data into specific data formats of video data and audio data.

4. The DMB package of claim 1, wherein the DMB data converter including a video data converter for converting a data format of video data of the DMB data into a video data format which can be reproduced by the mobile terminal.

5. The DMB package of claim 4, wherein if the DMB data is satellite DMB data, the DMB data converter converts video data of an H.264 (Advanced Video Coding H.264/MPEG-4 Part 10) data format into video data of an MPEG-4 (Motion Pictures Experts Group-4) data format and outputs the video data converted into the MPEG-4 data format to the mobile terminal.

6. The DMB package of claim 4, wherein the DMB data converter includes an audio data converter for converting a data format of audio data of the DMB data into an audio data format which can be reproduced by the mobile terminal.

7. The DMB package of claim 3, wherein the DMB signal analyzer extracts information data of the DMB data from the received DMB data.

8. The DMB package of claim 7, further comprising a data carousel for receiving the information data and extracting information data according to a user's selection.

9. The DMB package of claim 3, wherein the DMB signal analyzer extracts broadcasting program information per channel from the received DMB data.

10. The DMB package of claim 1, wherein the DMB package software installation checking unit includes DMB package software installation data for installing the DMB package software and installs the DMB package software in the mobile terminal in response to a control of the DMB package controller.

11. The DMB package of claim 3, further comprising a data conversion yes/no determiner for:
   receiving multimedia data format information which can be reproduced by the mobile terminal; and
   determining whether the data formats of the received DMB data can be converted into data formats according to the received multimedia data format information.

12. The DMB package of claim 11, wherein the DMB data converter converts the data format of the video data of the received DMB data into a video data format which can be reproduced by the mobile terminal.

13. The DMB package of claim 11, wherein if any one of the video data and the audio data of the DMB data has a data format which can be reproduced by the mobile terminal, the DMB package converter converts a data format of data, which does not have the mobile terminal reproducible data format, into a data format, which can be reproduced by the mobile terminal, and transmits the converted data to the mobile terminal.

14. The DMB package of claim 11, wherein if both the video data and the audio data of the DMB data have data formats which can be reproduced by the mobile terminal, the DMB package converter transmits the DMB data received through the DMB signal receiving unit to the mobile terminal without the data format.

15. A mobile terminal, having a display unit for decoding and reproducing multimedia data, and a digital multimedia broadcasting (DMB) package for receiving DMB data through an antenna, and converting data formats of the received DMB data into data formats which can be reproduced by the mobile terminal, the mobile terminal comprising:
   the display unit for displaying image information;
   an audible sound output unit for outputting audible sound;
   a terminal interface unit for interfacing with the DMB package; and
   a terminal controller for:
   outputting an input signal corresponding to a user's input, to the DMB package through the terminal interface unit;
   receiving the DMB data from the DMB package;
   reproducing the received DMB data, and
   a terminal memory unit in which DMB package software for allowing the mobile terminal and the DMB package to interface and be compatible with each other is stored,
   wherein if an input for outputting broadcasting program information per channel of DMB is selected by a user, the terminal controller receives the broadcasting program information per channel from the DMB package, and outputs the received broadcasting program information per channel as image information.

16. The mobile terminal of claim 15, wherein if an input for outputting information data of DMB is selected by the user, the terminal controller receives the information data from the DMB package and outputs the received information data as image information using the DMB package software.

17. A method of receiving digital multimedia broadcasting (DMB) data using a DMB package matched with a mobile terminal through a DMB package interface unit and reproducing the received DMB data through the mobile terminal, the method comprising the steps of:
- receiving, by the DMB package, the DMB data;
- determining whether a key input signal is input from the mobile terminal;
- if it is determined that a key input signal corresponding to a selected channel has been input, receiving DMB data corresponding to the selected channel and converting data formats of the received DMB data into data formats according to a predetermined data format conversion; and
- outputting the converted DMB data to the mobile terminal.

18. The method of claim 17, wherein the step of receiving further includes:
- determining whether DMB package software for converting information data and broadcasting program information per channel of DMB into image information and outputting the converted image information, is installed in the mobile terminal.

19. The method of claim 18, wherein the step of determining whether the DMB Package Software is installed further includes:
- checking, by the DMB package, whether the DMB package software is installed in the mobile terminal; and
- controlling the mobile terminal to inform a user of the result of the checking.

20. The method of claim 18, further including:
- checking, by the DMB package, whether the DMB package software is installed in the mobile terminal; and
- installing the DMB package software in the mobile terminal using prepared installation data of the DMB package software, if it is determined that the DMB package software is not installed in the mobile terminal.

21. The method of claim 17, wherein the step of receiving and converting further includes:
- receiving, by the DMB package, information on multimedia data formats which can be reproduced by the mobile terminal and setting a data format conversion of the DMB data according to the received multimedia data formats; and
- receiving DMB data corresponding to the selected channel and converting data formats of the received DMB data into data formats according to the set data format conversion.

22. The method of claim 21, wherein the step of setting a data format conversion includes:
- requesting, by the DMB package, information on multimedia data formats which can be reproduced by the mobile terminal from the mobile terminal;
- receiving the multimedia data format information from the mobile terminal; and
- setting the data format conversion of the DMB data into multimedia data formats which can be reproduced by the mobile terminal according to whether multimedia data of the DMB data can be converted based on the received multimedia data format information.

23. The method of claim 22, wherein the step of setting the data format conversion includes:
- determining, by the DMB package, whether the multimedia data of the DMB data can be converted based on the received multimedia data format information; and
- setting the data format conversion of the DMB data into multimedia data formats which can be reproduced by the mobile terminal according to results of the determination.

24. The method of claim 23, wherein the step of determining whether multimedia data of the DMB data can be converted further includes determining, by the DMB package, according to the received multimedia data format information, whether the mobile terminal can reproduce the multimedia data of the DMB data.

25. The method of claim 23, wherein the step of setting the data format conversion includes setting, by the DMB package, the data format conversion of the multimedia data of the DMB data into multimedia data formats which can be reproduced by the mobile terminal if it is determined that the mobile terminal cannot reproduce the multimedia data of the DMB.

26. The method of claim 17, wherein the step of receiving and converting includes extracting, by the DMB package, information data of the DMB data according to a user's selection from the DMB data and providing the extracted information data to the mobile terminal if it is determined that the key input signal corresponds to a key for outputting information data.

27. The method of claim 17, wherein the step of receiving and converting includes extracting, by the DMB package, broadcasting program information per channel from the DMB data and providing the extracted broadcasting program information per channel to the mobile terminal if it is determined that the key input signal corresponds to a key for outputting broadcasting program information per channel of the DMB data.

28. A method of receiving digital multimedia broadcasting (DMB) data using a DMB package matched through an interface unit of a mobile terminal and reproducing the received DMB data through the mobile terminal, the method comprising the steps of:
- if the DMB package is matched with the mobile terminal, recognizing, by the mobile terminal, the DMB package;
- transmitting a key input signal according to a user's key selection to the DMB package;
- receiving multimedia data of DMB data whose data formats have been converted into mobile terminal reproducible data formats, from the DMB package; and
- reproducing the received multimedia data.

29. The method of claim 28, wherein the step of recognizing further includes checking, by the mobile terminal, according to a request of the DMB package whether DMB package software for allowing the mobile terminal and the DMB package to interface and be compatible with each other is installed.

30. The method of claim 29, wherein the step of checking further includes transmitting, by the mobile terminal, the results of the checking to the DMB package.

31. The method of claim 30, wherein the step of transmitting the checking result further includes informing, by the mobile terminal, the user that the DMB package software is not installed in response to a control of the DMB package if it is determined that the DMB package software is not installed.

32. The method of claim 29, wherein the step of transmitting the results of the checking includes:
- receiving, by the mobile terminal, installation data of the DMB package software from the DMB package if it is determined that DMB package software is not installed; and
- receiving the DMB package software from the DMB package and installing the DMB package software.

33. The method of claim 28, wherein the step of recognizing further includes providing, by the mobile terminal, information on reproducible multimedia data formats to the DMB package in response to a request of the DMB package.

34. The method of claim 28, further comprising receiving, by the mobile terminal, information data of the DMB data according to the user's selection from the DMB package and outputting the received information data.

35. The method of claim 34, wherein the step of receiving and outputting the information data includes:
   receiving, by the mobile terminal, the information data from the DMB package; and
   converting the received information data into image information using the installed DMB package software and outputting the converted image information.

36. The method of claim 28, further comprising outputting, by the mobile terminal, broadcasting program information per channel of DMB as image information.

37. The method of claim 36, wherein the step of outputting broadcasting program information per channel includes:
   receiving, by the mobile terminal, the broadcasting program information per channel of DMB from the DMB package and parsing the received broadcasting program information per channel in response to a control of the DMB package; and
   converting the broadcasting program information per channel into image information using the DMB package software and outputting the converted image information.

38. The mobile terminal of claim 15, wherein the received broadcasting program information per channel is parsed.

* * * * *